United States Patent [19]
Schegerin

[11] 4,272,578
[45] Jun. 9, 1981

[54] SKI APPARATUS

[76] Inventor: Robert J. F. Schegerin, 44 Ave. Gabriel Teri, 91430 Igny, France

[21] Appl. No.: 44,174

[22] Filed: May 31, 1979

[51] Int. Cl.³ .............................................. B32B 3/12
[52] U.S. Cl. .................................... 428/113; 280/610;
428/295; 428/902; 428/117; 428/116; 428/212
[58] Field of Search ................ 428/73, 116, 117, 113,
428/293, 295, 902, 118; 280/610

[56] References Cited
U.S. PATENT DOCUMENTS

| | | | |
|---|---|---|---|
| 3,249,659 | 5/1966 | Voelker | 156/79 X |
| 3,276,784 | 10/1966 | Anderson, Jr. | 280/610 |
| 3,740,301 | 6/1973 | Manning et al. | 280/610 X |
| 3,902,732 | 9/1975 | Fosha, Jr. et al. | 280/610 X |
| 3,918,731 | 11/1975 | Legrand | 280/610 |

*Primary Examiner*—Henry F. Epstein

*Attorney, Agent, or Firm*—Steinberg & Raskin

[57] ABSTRACT

Ski structure having good vibratory characteristics formed of a composite material including a core of light material for which the maximum allowable shear stress in the longitudinal direction and the maximum allowable vertical compression stress are, respectively, greater than 25 bars and 21 bars, the core being disposed between upper and lower working layers. The upper layer is constituted by a material whose modulus of elasticity in the longitudinal direction is less than 4,700 hbars. The material of the lower layer has a modulus of elasticity greater than 4,700 hbars. The product of the cross-sectional area and modulus of elasticity is between about 140,000 and 400,000 hbars mm² for the upper layer, and between about 130,000 and 500,000 hbars mm² for the lower layer.

20 Claims, 4 Drawing Figures

SKI APPARATUS

BACKGROUND OF THE INVENTION

This invention relates generally to ski structure and, more particularly, to a new ski structure formed of a composite material.

Modern skis must have very precise mechanical characteristics. More particularly, the rigidity of modern skis both in flection (bending) and torsion at every point on the ski must be well defined. More particularly, modern skis must be so constructed that the values of the rigidities in both torsion and in flection permit improved disengagement as well as improved performance in turns while at the same time being sufficiently great so as to maintain the structural integrity of the ski.

Further, it is important that the ski exhibit satisfactory vibratory behavior. More particularly, it is important for a ski when subjected to shocks to vibrate in a manner such that the natural frequency of such vibrations will be relatively high, so that the amplitude of the vibration under a given shock will be low and so that the natural damping of the ski will be substantial.

Many ski constructions heretofore proposed satisfy the first two of these conditions, namely such skis have both good flection and torsional characteristics. However, such conventional skis do not provide satisfactory vibration characteristics. In particular, skis having a composite structure which include a core formed of wood and/or rigid synthetic foam, and/or stressed or non-stressed cellular structures, and/or stressed or non-stressed polymerized materials, disposed between a pair of layers of resin impregnated glass fibers, are known. Such skis have good torsion and bending strength characteristics. However, the vibratory characteristics of such known skis are not entirely satisfactory.

For example, ski structure is disclosed in French Pat. No. 2,099,443 which comprises a honeycomb core, a layer of fibers oriented longitudinally with respect to the ski and affixed on the upper and lower faces of the core, and at least one layer of fibers wound in a spiral around the core which is provided with two layers of longitudinally extending fibers. Although such structure has good static mechanical properties, a substantial longitudinal force is transitted to the edge of the ski structure. In order to overcome this drawback, edge members are required which are discontinuous or flexible and which are formed of a plurality of metal strands wound in a spiral configuration. Such edge members are, however, relatively complicated in construction, fragile with respect to bias shocks, and unduly add to the weight of the ski without substantially increasing its rigidity. This increase in weight contributes to a reduction in the vibratory qualities of the ski.

SUMMARY OF THE INVENTION

Accordingly, one object of the present invention is to provide a new and improved ski structure.

Another object of the present invention is to provide a new and improved ski structure having good mechanical properties and excellent vibratory characteristics.

In accordance with the present invention, these and other objects are obtained by providing ski structure having a composite structure including a core, a working upper layer and a working lower layer. The working upper layer comprises a material whose modulus of elasticity in a direction longitudinal with respect to the ski is less than 4,700 hbars and wherein the product of this modulus of elasticity and the cross-sectional area of the layer is between about 140,000 hbars mm$^2$ and about 400,000 hbars mm$^2$. The working lower layer comprises a material whose modulus of elasticity in a direction longitudinal with respect to the ski is greater than 4,700 hbars and wherein the product of the modulus of elasticity and the cross-sectional area of this layer is between about 130,000 hbars mm$^2$ and about 530,000 hbars mm$^2$.

The core comprises a relatively light material for which the maximum allowable shear stress in the longitudinal direction with respect to the ski is greater than about 25 bars and the maximum allowable compressive stress in the vertical direction (when the ski is horizontal) is greater than about 21 bars.

The upper and the lower layers are preferably formed of different materials since they do not work under similar conditions.

The working lower layer is bonded, such as by gluing, on the one hand to the central core and on the other hand to metallic lower edges which are preferably continuous over the length of the ski structure. The structure thus defined permits a flux of relatively low force to flow into the lower edges of the structure and hence to have an assembly formed by the upper layer, the lower layer, the core and the edges which will be coherent, light, and have excellent vibratory characteristics.

Furthermore, the critical value of the relative stretch range of the material constituting the lower layer is preferably of the same order as, or greater than, that of the edges. For this lower layer, material formed primarily of fibers having a relatively high modulus of elasticity, which material may further include fibers having a relatively low modulus of elasticity, is used. The two types of fibers are oriented substantially longitudinally to the ski and impregnated with a resin. Although the fibers of high elasticity modulus can be distributed over the entirety of the lower layer, such fibers can also be combined in one or more sectors which constitute only a portion of the layer, the remainder of the layer being constituted by fibers having a low modulus of elasticity.

To improve the rigidity and shear strength of the lower layer, fibers may be added to the material forming the same, such additional fibers forming an angle of $+\alpha$ and an angle of $-\alpha$ with the longitudinal direction of the ski, $\alpha$ being greater than about 0° and less than or equal to about 90°. The best result is obtained when about 50% of these additional or supplementary fibers form an angle of about 45° while the remaining 50% form an angle of $-45°$ to the longitudinal direction of the ski. These supplementary fibers have the effect of increasing the rigidity and torsional strength of the ski.

Among the fibers with a high modulus of elasticity which are particularly suited for use in the lower layer of the ski structure of the present invention, are fibers formed of boron, carbon and Kevlar. Hybrid materials comprising fibers of different nature, such as in the form of fabrics or stacks, for example, may be utilized. It is advantageous to use, for this lower layer, fibers of boron which extend in the longitudinal direction and fibers of carbon or glass which extend in an oblique direction as described above. Another, more economical embodiment of the invention, utilizes fibers of Kevlar which extend in the longitudinal direction of the ski and glass fibers which extend perpendicularly to the longitudinal direction of the ski, i.e., transversely.

The material forming the upper layer must have a high compressive strength and rigidity which is lower than that of the material of the lower layer. The material comprising this upper layer preferably is formed by fibers having a relatively low modulus of elasticity, which fibers are impregnated with a resin and oriented in the longitudinal direction with respect to the ski. As in the case of the lower layer, the materials of the upper layer can be formed of additional fibers which extend obliquely with respect to the longitudinal axis of the ski, preferably about 50% of such supplementary fibers extending at an angle $\beta$ and about 50% at an angle $-\beta$ with the longitudinal direction of the ski, wherein $\beta$ is greater than about 0° and less than or equal to about 90°. These fibers can likewise appear in the form of fabrics or stacks.

Fibers having a low modulus of elasticity which can be utilized in connection with the above include glass fibers. A material particularly advantageous for the upper layer includes a glass fabric impregnated with a resin, the fabric containing about 90% fibers oriented longitudinally to the ski and about 10% fibers oriented transversely to the ski.

In the two layers which surround the core, the resin which impregnates the fibers can advantageously constitute an epoxy resin or a polyester resin.

The essential function of the core is to join or unite the upper layer to the lower layer. The core, therefore, is subjected primarily to shear forces during operation. It also is subjected to compressive forces in the vicinity of the attachments of the ski on to the boot. Any material having good shear and compression strength, therefore, can be utilized to form the core. Among such materials are included rigid foams, wood, expanded plastics, prestressed or not, and cellular structures. Cellular structures of the honeycomb type have been found particularly useful in this connection, whether such structure is formed of a light alloy or by a polymer or cellulose-based material. Honeycomb structures have directions h, L and W, illustrated in FIG. 2, discussed below. According to the illustrated embodiment, the direction h of the honeycomb must be substantially vertical when the ski is horizontal so that the compression forces incident thereon will be sufficiently absorbed. In general, available materials have definite maximum allowable shear and compression stresses which characterize these materials. Thus, for a given ski geometry and for a given magnitude of the forces applied to the ski, the critical value of the material utilized for the core will be either the maximum allowable compressive or the maximum allowable shear strength. In other words, for a given external load situation, the material will first fail either in shear or in compression.

In a honeycomb structure having a particular mesh or cell geometry and wall thickness, a shear plane which is disposed parallel to the axes of the cells, will have a shear strength associated therewith which varies with the orientation of the shear stresses. The maximum allowable stress in direction L is always greater than the maximum allowable stress in direction W. Consequently, for a given honeycomb structure with hexagonal cell geometry, if the shear stress is more critical than the compression stress, it is advantageous to orient direction L of the honeycomb longitudinally to the ski in order not to increase the thickness of the wall of the honeycomb, and hence to have a minimal core mass.

If the compression strength is more critical than the shear strength, the orientation of the honeycomb may be in any direction and the mass of the core therefore will be independent of the orientation of the honeycomb relative to the ski (assuming that direction h remains substantially vertical when the ski is horizontal). In the latter case, it will be less expensive to place the direction L of the honeycomb perpendicular to the long direction of the ski. However, in the case where the maximum allowable shear strength is more critical than the maximum allowable compression strength, it is advantageous to "under-expand" the honeycomb thereby increasing the maximum allowable shear strength without changing the maximum allowable compression strength. In this manner, a more optimal material is achieved since it is critical both in shear and in compression.

In all cases, the honeycomb can be filled in spots with glue or foam in order to facilitate machining of the thin parts, the sides thereof, the location of any attachments, or to change the mass distribution along the ski, when desired.

DESCRIPTION OF THE DRAWINGS

A more complete appreciation of this invention and many of the attendant advantages thereof will be readily appreciated as the same becomes better understood by reference to the following detailed description when considered in connection with the accompanying drawings in which.

DESCRIPTION OF THE PREFERRED EMBODIMENT

Figure 1:
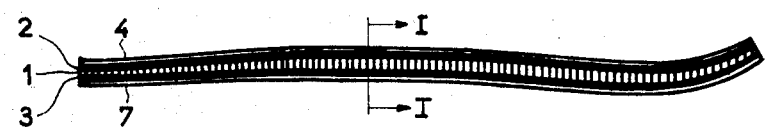
FIG. 1 is a front elevation view in section of a ski structure according to the present invention wherein the honeycomb core is profiled in the direction of the strip in accordance with the longitudinal profile of the ski.
Figure 2:
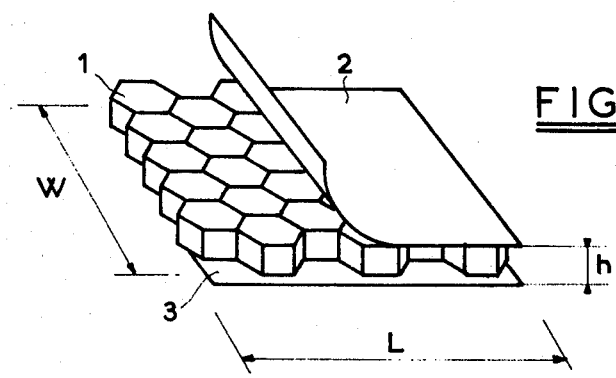
FIG. 2 is a schematic perspective view of the composite structure of a preferred embodiment of the present invention.
Figure 3:
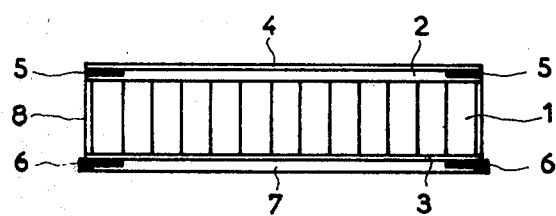
FIG. 3 is a sectional view taken along line 1—1 of FIG. 1.

Referring now to the drawings wherein like reference characters designate identical or corresponding parts throughout the several views, a ski according to the present invention includes a honeycomb core 1, a working upper layer 2, and a working lower layer 3. Directions L, W and h of the honeycomb are shown in FIG. 2. The upper layer 2 is glued to the honeycomb structure 1 and is protected against cuts and shocks by a surface layer 4, preferably formed of ABS (acrylonitrile-butadiene-styrene) copolymer, and by upper edges 5 formed of metal or plastic (FIG. 3). The lower layer 3 is likewise glued on the honeycomb structure and is bonded, also by gluing, to the metal edges 6 (FIG. 3) and to a sliding sole member 7. The sides 8 are formed by spot filling of resin inside the honeycomb or by gluing to ABS material.

In manufacture, the upper and lower layers 2, 3 are first manufactured, whereupon the metal edges and sliding sole member are glued onto the lower layer of the ski structure. The honeycomb is then filled in spots by a low density glue, particularly in the parts corresponding to the sides and the attachments. The resulting assembly including the edges, the sliding sole member and the lower layer is then glued to the honeycomb core which is then machined to the desired profile. To complete the ski structure, the assembly comprising the upper layer, the protective edges and the surface layer of ABS copolymer is glued to the top of the honeycomb core, whereupon the final machining and painting are accomplished.

A variation of the method for manufacturing a ski according to the present invention comprises manufacturing the upper and lower layers of a single piece. For example, a rectangular cloth of fibers having a low modulus of elasticity is prepared, the length of the rectangle corresponding to the length of the ski, the width of the rectangle corresponding to the perimeter of the cross-section of the core. The central band of the rectangle whose length is the length of the ski and whose width is the sum of the width of the cores and of two thicknesses of the core, is designed to receive the upper face of the core and the sides thereof. The two remaining lateral bands are reinforced by fibers having a high modulus of elasticity parallel to the length of the rectangle and constitute the working lower layer. The core, partly filled with glue, is surrounded with the aid of this fabric cloth impregnated with resin. At this point, the edges, the sliding sole member and the surface layer are attached in the same manner as described above in connection with the preceding method of manufacture.

The ski according to the present invention has static mechanical properties comparable to those of existing skis. More particularly, the flection and bending characteristics of the ski structure according to the present invention are substantially the same as those of the best competition skis which are available today. However, the vibratory characteristics of the ski structure constructed according to the present invention are significantly improved relative to conventional skis. In particular, the natural frequency, the maximum amplitude of vibration under a given shock load, and the natural damping characteristics of the ski of the present invention are vastly improved relative to conventional skis.

The characteristics of skis constructed according to the present invention have been quantitatively compared with those of skis of the prior art. For this purpose, two test boxes were constructed, both of which were adapted to react in the same way as skis of corresponding structure having the form illustrated in FIG. 4. One test box had a cross-section, designated II—II in FIG. 4, which can be represented by the structure of the present invention illustrated in FIG. 3. Thus, box No. 1 was constructed having a structure according to that of the skis of the present invention. Box No. 1 was in particular defined by a rectangular lower face of 1,100 mm×80 mm, a small rectangular end face 9 of 80 mm×7.6 mm, a large rectangular end face of 80 mm×27 mm, two lateral faces in the form of rectangular trapezoids 10 having a base of 1,100 mm, a long side of 27 mm and a short side of 7.6 mm, and by a rectangular upper face 11. Box No. 1 was constructed according to the method described above according to the present invention, the honeycomb structure being machined to obtain the finished box illustrated in FIG. 4. The internal structure of the test box as seen along a section II—II in FIG. 4 corresponds to the illustration of FIG. 3.

The working upper layer has a thickness of 0.8 mm and is constituted by a glass fabric in which 90% of the fibers are oriented longitudinally to the ski while 10% are oriented in the transverse direction and are impregnated with an epoxy resin.

The working lower layer has a thickness of 0.4 mm and is constituted by a layer of 0.2 mm in thickness of boron fibers oriented longitudinally to the ski and by a layer of 0.2 mm thickness of carbon fibers oriented at +45° and at −45° with respect to the longitudinal direction of the ski.

The core comprises a honeycomb structure of aluminum alloy having a thickness which varies from 3.6 mm to 23 mm between the two ends of the box.

Figure 4:
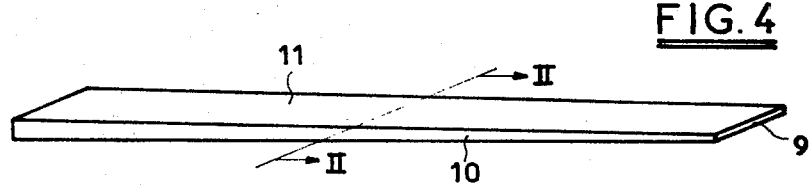
FIG. 4 is a perspective view of a test box used in comparative tests of the properties of the present invention.

Box No. 2, having a structure conforming to a ski of the prior art, has the same outer configuration as box No. 1 illustrated in FIG. 4. However, some of the dimensions are slightly different so that the mechanical characteristics, namely the bending and torsional rigidities, of boxes Nos. 1 and 2 would be substantially identical.

More particularly, box No. 2 was defined by a rectangular face of 1,100 mm×80 mm, a small rectangular end face 9 of 80 mm×8.4 mm, a large rectangular end face of 23.4 mm×80 mm, two lateral faces in the form of rectangular trapezoids 10, with a base of 1,100 mm, a large side of 23.4 mm and a small side of 8.4 mm and by a rectangular upper face 11. This box was constructed having a core formed of wood and synthetic foam 1, disposed between a pair of working layers 2, 3 having a thickness of 1 mm, the latter being formed of glass fabric similar to the glass fabric of the upper layer of box No. 1, described above.

The thickness of the core of the test box varied between 3.6 mm and 18.6 mm between the two ends of each box.

Further, boxes Nos. 1 and 2 each have a sliding sole member and edges with a total thickness of 2 mm under the lower working layer and a protective layer with a thickness of 0.8 mm of ABS copolymer on the upper working layer. During the comparative testing, the following measurements were made on the respective boxes:

1. The respective weight.
2. The respective bending characteristics. For this measurement, the thick end of the box represented in FIG. 4 was enclosed between two jaws over a length of 230 mm. A force of 100 Newtons was applied at a distance of 50 mm from the thin end 9 and the resulting deflection measured.
3. The torsional characteristics. For this measurement, the test boxes were enclosed in the same manner as above. A couple of 1 daNm was applied to the thin end 9 and the resulting deflection measured at a distance from the axis of the ski equal to 450 mm.
4. The natural frequency characteristics.
5. The natural damping characteristics. This comprised the time required for an amplitude of vibration to be reduced by one-half.

The results of the comparative tests were as follows:

|  | Box No. 1 | Box No. 2 |
| --- | --- | --- |
| Weight | 855 g | 1,215 g |
| Bending | 39 mm | 45 mm |
| Torsion | 80 | 70 |
| Natural frequency | 21.6 Hz | 17 Hz |
| Natural damping | 0.32 s | 0.45 s |

It is believed apparent from the results of the comparative tests summarized above that the test box having the structure of the ski according to the present invention results in a savings in weight of approximately 30% and, additionally, improvements in the natural frequency and natural damping thereof of 25% and 30%, respectively.

Obviously, numerous modifications and variations of the present invention are possible in the light of the above teachings. It is therefore to be understood that within the scope of the claims, the invention may be practiced otherwise than is specifically described herein.

What is claimed is:

1. Composite ski structure having longitudinal and transverse dimensions comprising:
   a core having upper and lower surfaces extending over at least a major portion of the length of the ski structure and formed of a material having a maximum allowable shear stress in the longitudinal direction greater than about 25 bars and a maximum allowable compressive stress in a direction normal to said longitudinal and transverse dimensions greater than about 21 bars;
   a working upper layer affixed to the upper surface of said core comprising a material having a modulus of elasticity in the longitudinal direction of less than about 4,700 hbars, and said upper layer having a cross-sectional area such that the product of the modulus of elasticity and the cross-sectional area of said upper layer is in the range of between about 140,000 hbars mm$^2$ and about 400,000 hbars mm$^2$; and
   a working lower layer affixed to the lower surface of said core comprising a material different from the material which comprises said working upper layer and having a modulus of elasticity in the longitudinal direction of greater than about 4,700 hbars, said lower layer having a cross-sectional area such that the product of the modulus of elasticity and the cross-sectional area of said lower layer is in the range of between about 130,000 hbars mm$^2$ and about 530,000 hbars mm$^2$.

2. Ski structure as recited in claim 1 wherein the material comprising said lower layer is formed primarily by fibers having a relatively high modulus of elasticity impregnated with a resin, said fibers being oriented substantially in said longitudinal direction.

3. Ski structure as recited in claim 2 wherein said material comprising said lower layer is further formed by fibers having a relatively low modulus of elasticity which are oriented substantially in said longitudinal direction.

4. Ski structure as recited in claim 2 wherein said fibers are distributed over the substantial entirety of the lower layer.

5. Ski structure as recited in claim 3 where said high elasticity modulus fibers are confined in at least one sector which constitutes only a portion of said lower layer, the remainder of said lower layer being formed of said low elasticity modulus fibers.

6. Ski structure as recited in claim 2 wherein the material comprising said lower layer is further formed by fibers which are oriented at angles $\pm\alpha$ to the longitudinal direction of said structure, $\alpha$ being greater than about 0° and less than or equal to about 90°.

7. Ski structure as recited in claim 6 wherein said fibers which are oriented substantially in the longitudinal direction are formed of boron and the fibers oriented at angles $\pm\alpha$ are formed by carbon.

8. Ski structure as recited in claim 7 wherein $\alpha=45°$.

9. Ski structure as recited in claim 2 wherein the material comprising said upper layer is formed primarily by fibers having a relatively low modulus of elasticity impregnated with a resin, said fiber being oriented substantially in said longitudinal direction.

10. Ski structure as recited in claim 9 wherein the material comprising said lower layer is further formed by fibers which are oriented by angles $\pm\beta$ to the longitudinal direction of said structure, $\beta$ being greater than about 0° and less than or equal to about 90°.

11. Ski structure as recited in claim 9 wherein said low elasticity modulus fibers comprising said upper layer are glass fibers.

12. Ski structure as recited in claim 11 wherein said upper layer comprises a glass fabric, about 90% of the fibers of which are oriented substantially in said longitudinal direction and about 10% of the fibers of which are oriented substantially in said transverse direction.

13. Ski structure as recited in claim 1 wherein said material forming the core is a cellular structure and said cellular structure comprises a honeycomb structure.

14. Ski structure as recited in claim 13 wherein the cavities defined within said honeycomb structure are at least partially filled with a rigid material.

15. Ski structure as recited in claim 13 wherein said material forming the honeycomb structure comprises a light metallic alloy.

16. Ski structure as recited in claim 13 wherein said material forming the honeycomb structure comprises a polymer material.

17. Ski structure as recited in claim 13 wherein said material forming the honeycomb structure comprises a cellulose-base material.

18. Ski structure as recited in claim 2 wherein said high elasticity modulus fibers are formed of boron.

19. Ski structure as recited in claim 2 wherein said high elasticity modulus fibers are formed of carbon.

20. Ski structure as recited in claim 2 wherein said high elasticity modulus fibers are formed of Kevlar.

* * * * *